US006474305B1

(12) United States Patent
Kimura

(10) Patent No.: US 6,474,305 B1
(45) Date of Patent: Nov. 5, 2002

(54) V-TYPE DIESEL ENGINE WITH COMMON RAIL

(75) Inventor: Haruyo Kimura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/723,611

(22) Filed: Nov. 28, 2000

(30) Foreign Application Priority Data

Dec. 3, 1999 (JP) ............................................. 11-345258

(51) Int. Cl.$^7$ ............................................... F02M 55/02
(52) U.S. Cl. ......................... 123/456; 123/468; 123/509
(58) Field of Search ........................ 123/184.31–184.37, 123/456, 509, 470, 54.4–54.8, 468

(56) References Cited

U.S. PATENT DOCUMENTS

| | | | | |
|---|---|---|---|---|
| 4,372,120 A | * | 2/1983 | Ford, Jr. et al. | 123/184.31 X |
| 4,412,513 A | * | 11/1983 | Obermayer et al. | 123/509 X |
| 4,570,602 A | * | 2/1986 | Atkins et al. | 123/468 |
| 5,197,436 A | * | 3/1993 | Ozawa | 123/456 |
| 5,309,885 A | * | 5/1994 | Rawlings et al. | 123/509 |

FOREIGN PATENT DOCUMENTS

| | | | |
|---|---|---|---|
| EP | 0 892 170 A1 | 1/1999 | ........... F02M/39/00 |
| JP | 6-117343 | * 4/1994 | .................. 123/470 |
| JP | 11-229940 | 8/1999 | ........... F02D/41/38 |
| JP | 11-229991 | 8/1999 | |
| JP | 11-230004 | 8/1999 | ........... F02M/55/02 |

* cited by examiner

*Primary Examiner*—Tony M. Argenbright
(74) *Attorney, Agent, or Firm*—McCormick, Paulding & Huber LLP

(57) ABSTRACT

A V-type diesel engine with a common rail, which does not elongate a total length of the engine even if a supply pump and/or common rail becomes longer. Two intake manifolds are mounted on inner walls of two banks of the engine. The common rail spans these intake manifolds to leave space below itself. The fuel pump is located at a bottom of an interbank valley of the banks and the common rail extends above the fuel pump so that the fuel pump and common rail can extend in an overlapping manner. The space below the common rail can accommodate other devices such as turbocharger and EGR cooler. Thus, a compact engine can be designed. The common rail bridging the intake manifolds also serves as a reinforcing member against vibration of the two banks.

17 Claims, 4 Drawing Sheets

V-TYPE DIESEL ENGINE WITH COMMON RAIL

BACKGROUND OF THE INVENTION

1. Field of the Invention

The present invention relates to a V-type diesel engine equipped with a common rail for a vehicle.

2. Description of the Related Art

The assignee filed a patent application regarding a V-type diesel engine with a common rail on Feb. 13, 1998 in Japan and this application was published on Aug. 24, 1999 with Laid-Open Publication No. 11-229991, the entire disclosure of which is incorporated herein by reference. This diesel engine has a supply pump (high pressure pump) and common rail located in series at a bottom of a V-shaped valley between two banks of the engine so that the supply pump and common rail are linearly arranged in a longitudinal direction of the engine. Arranging the supply pump and common rail in this manner does not elongate the length of the engine so that the engine can be designed compact as long as the length of the supply pump and that of the common rail are within a certain value.

However, if the length of the supply pump and/or common rail becomes longer, the total length of the supply pump and common rail may exceed the length of the engine. As a result, the object of JP 11-229991, i.e., making the engine compact, is not attained.

Further, an engine designer might think that a turbo charger, EGR cooler and/or other devices should also be located in the interbank valley of the engine. In such a case, the supply pump and/or common rail may become an obstacle if the arrangement of JP '991 is employed.

SUMMARY OF THE INVENTION

One of the objects of the present invention is to eliminate the above described problem.

According to one aspect of the present invention, two intake manifolds are attached to two banks of the engine, and a common rail spans these intake manifolds. The location of the common rail is shifted upwards so that a supply pump and the common rail can extend in an overlapping manner. The supply pump extends at a bottom of the interbank valley of the two banks of the engine. Thus, even if a long supply pump and/or common rail is employed, the total length of the engine is not be elongated. In addition, space is created below the common rail so that other devices can be placed below the common rail.

Other objects and advantages of the present invention will become apparent to those skilled in the art from the subsequent description and the appended claims, taken in conjunction with the accompanying drawings.

DETAILED DESCRIPTION OF THE INVENTION

Now, an embodiment of the present invention will be described in reference to the accompanying drawings.

Figure 5:
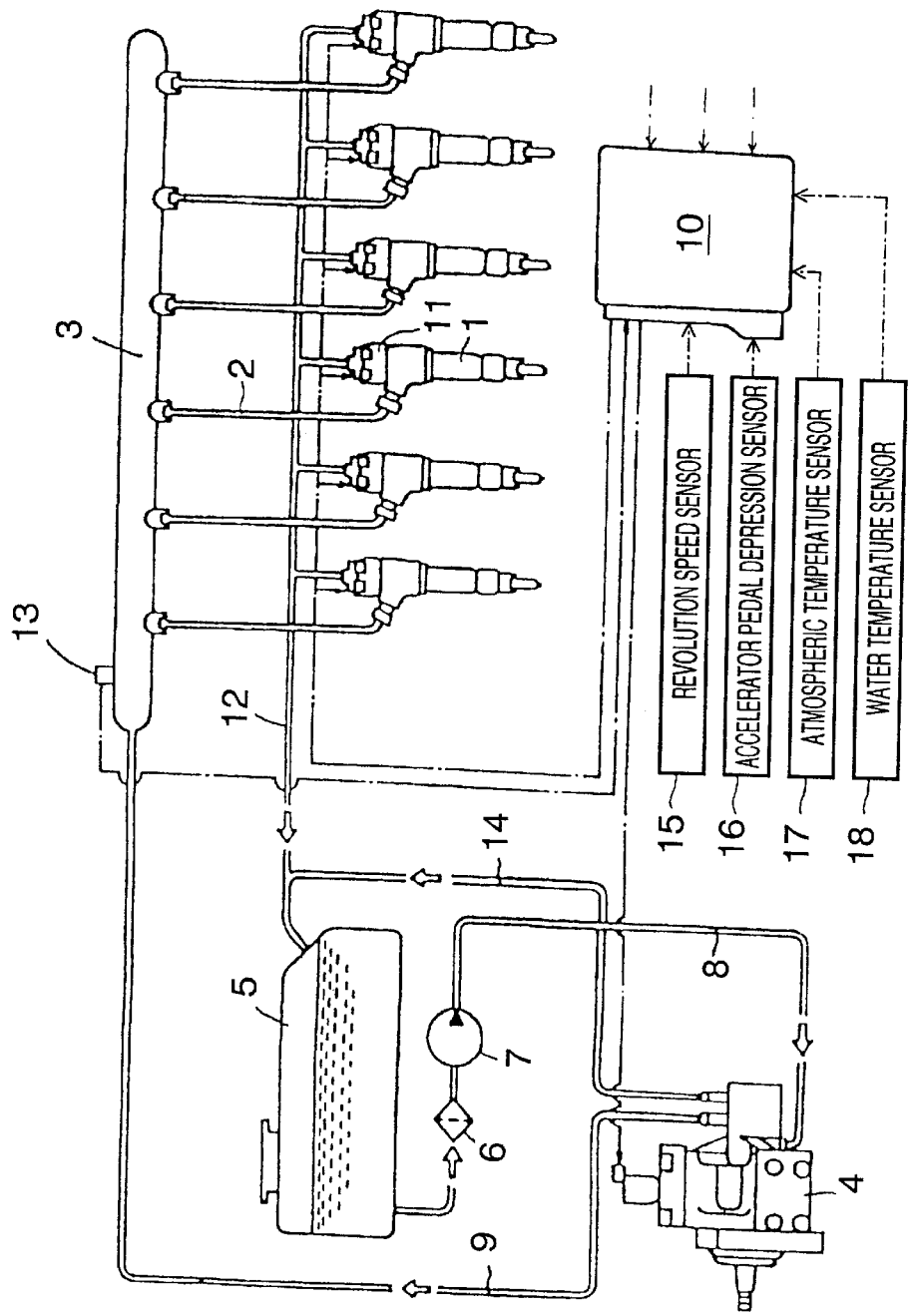
FIG. 5 illustrates a fuel injection system with the common rail, which is incorporated in the diesel engine shown in FIG. 1.

Referring first to FIG. 5, a fuel injection system with a common rail for a V-type automobile engine will be described.

This engine has six cylinders (not shown), and a single injector 1 is attached to each cylinder. A high pressure fuel (20 to 900 MPa; common rail pressure) is always fed to each injector 1 from a common rail 3 via an associated pipe 2. A fuel tank 5 feeds a fuel to the common rail 3 by primarily a supply pump (high pressure pump) 4. Specifically, the fuel of about atmospheric pressure in the fuel tank 5 is sucked to a feed pump 7 through a fuel filter 6, and then transmitted to the supply pump 4 via a feed pipe 8. Inside the supply pump 4, the fuel is pressurized to high pressure. The fuel is subsequently introduced to the common rail 3 via a high pressure pipe 9.

Fuel injection is controlled by an electronic control unit (ECU) 10. Specifically, ECU 10 sends a drive pulse to an electromagnetic valve 11 of each injector 1 in accordance with an engine running condition (revolution speed, load, etc.) so as to open and close the injector 1. When electricity is supplied to the solenoid valve 11, fuel injection takes place. When the solenoid valve 11 is turned off, the fuel injection is interrupted. During a deactivated condition of the solenoid valve 11, unnecessary fuel in the injector 1 is returned to the fuel tank 5 via a leakage pipe 12.

ECU 10 feedback controls the common rail pressure according to the engine running condition. Specifically, a pressure sensor 13 attached to the common rail 3 sends a detection value (common rail pressure) to ECU 10, and ECU 10 then adjusts an outlet pressure of the supply pump 4. Surplus fuel is returned to the fuel tank 5 via a return pipe 14. The common rail pressure itself is a fuel injection pressure.

ECU 10 is also fed an engine revolution speed from an engine speed sensor 15, accelerator pedal depression (how deep an accelerator pedal (not shown) is stamped by a driver's foot) from an accelerator pedal sensor 16, an atmospheric temperature from an atmospheric temperature sensor 17 and an engine water temperature from a water temperature sensor 18. Although not shown, other information is supplied to ECU 10 from other sensors to control the fuel injection.

Figure 1:
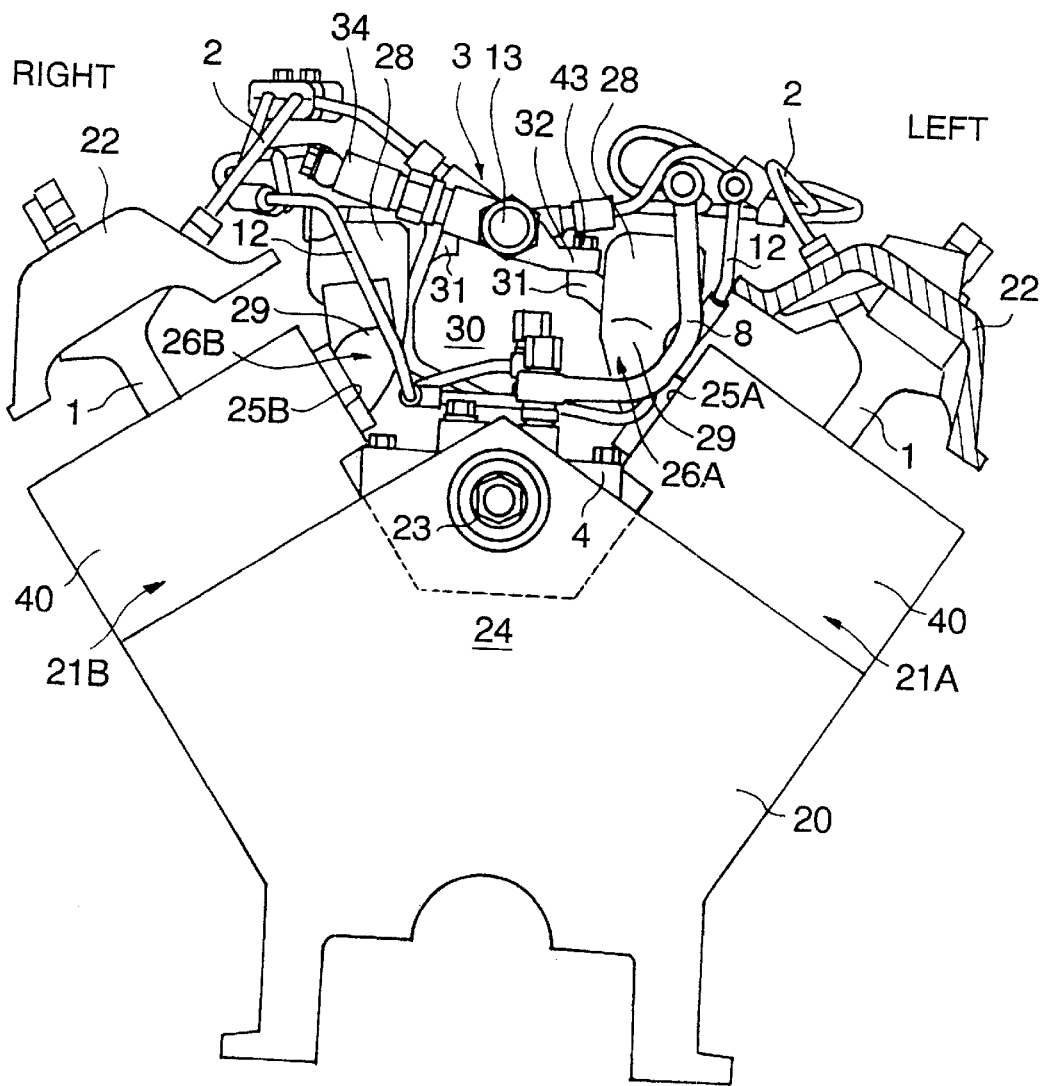
FIG. 1 illustrates a front view of a V-type diesel engine with a common rail according to the present invention.
Figure 2:
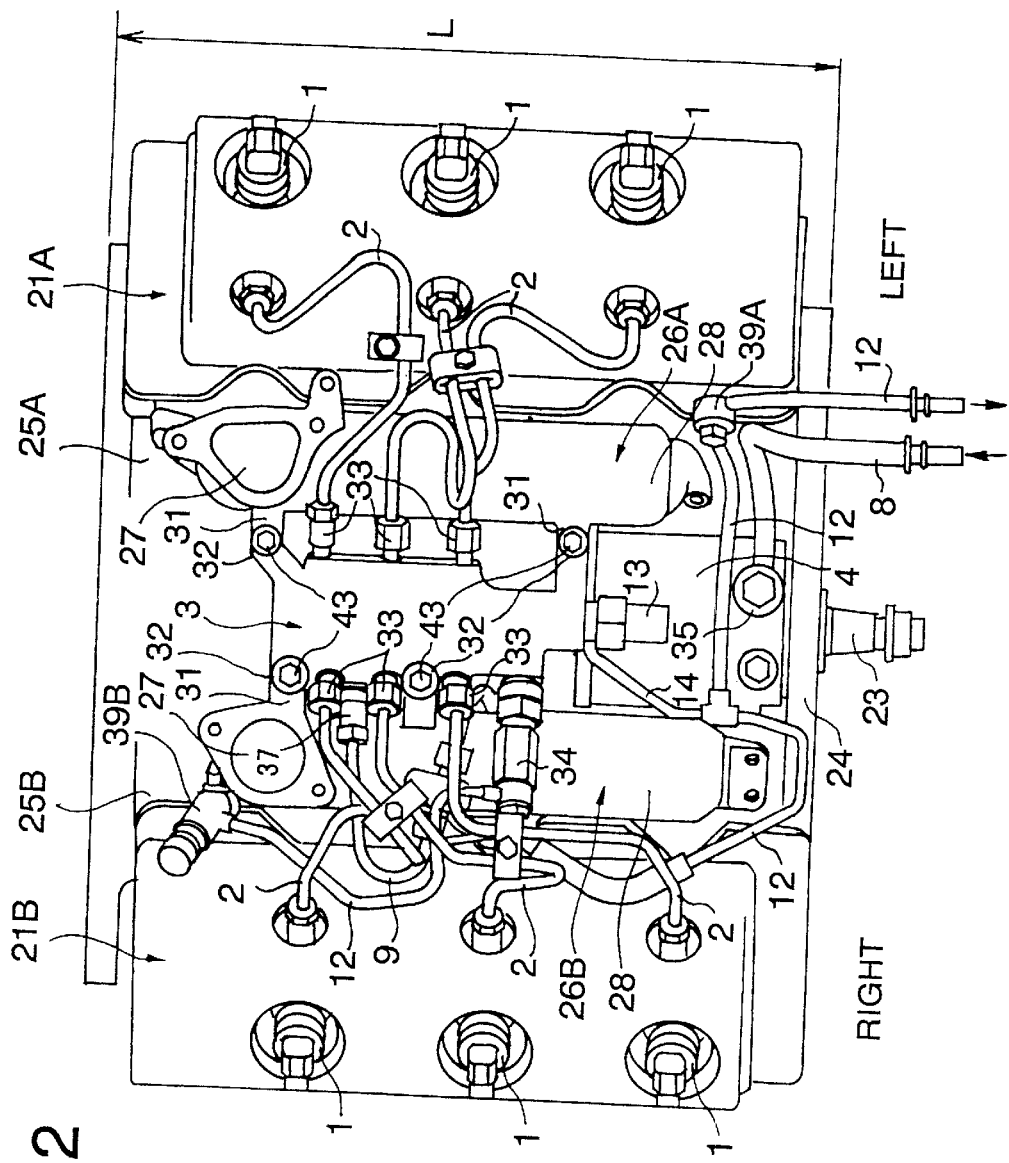
FIG. 2 illustrates a plan view of the diesel engine shown in FIG. 1.
Figure 3:
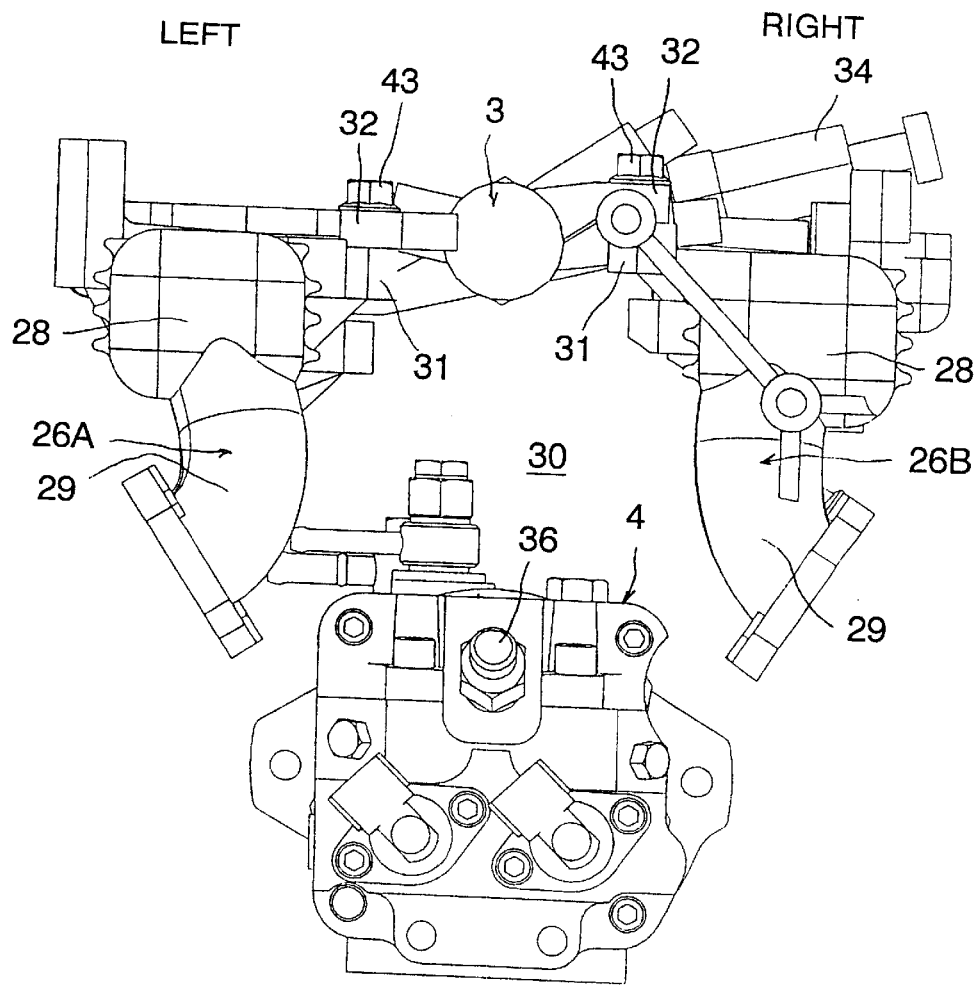
FIG. 3 only illustrates the common rail, intake manifolds and supply pump of the diesel engine shown in FIG. 1.

Referring to now FIGS. 1 to 3, illustrated is an engine layout according to the present invention. FIG. 1 is a front view and FIG. 3 is a rear view.

A cylinder block 20 and two cylinder heads 40 define two banks 21A and 21B. Each of the banks 21A and 21B has three cylinders. In FIG. 2, the six injectors 1 imply six cylinders. As illustrated, each three cylinders are arranged in a longitudinal direction of the engine or a longitudinal direction of the associated bank 21A/21B, and two banks extend in parallel to each other. The banks 21A and 21B are offset relative to each other in the longitudinal direction of the engine. It should be noted that frame-like spacers which are to be mounted on the cylinder heads 40 are not illustrated in FIG. 1, but head covers 22 to be fixed on the spacers are illustrated. "L" in FIG. 2 represents a total length of the engine.

The supply pump 4 is located at the bottom of the interbank valley between the banks 21A and 21B near a front end of the valley. A pump shaft 23 of the supply pump 4 penetrates a front end wall 24 of the cylinder block 20 and projects forward. The pump shaft 23 has a pulley or sprocket (not shown) near its free end, a crankshaft (not shown) of the engine also has a pulley or sprocket, and a belt or chain (not shown) engages over these pulleys or sprockets to drive (rotate) the pump shaft 23 by a drive power of the engine.

On facing inner walls 25A and 25B of the banks 21A and 21B, mounted are intake manifolds 26A and 26B. The intake air flowing in an intake air passage (not shown) is introduced into main bodies (collection portions) 28 of the respective intake manifolds 26A and 26B from manifold inlets 27. The intake air is then distributed to intake ports (not shown) of the cylinders from distribution ports 29. Thus, each intake manifold 26A/26B has the collection portion 28 upstream of the distribution port 29 as best seen in FIG. 1. If viewed from the bank inner wall 25A/25B, the distribution port 29 extends upwards non-linearly from the associated bank inner wall, and the collection portion 28 is integrally attached to the upper end of the distribution port 29. The intake manifolds 26A and 26B are spaced from each other so that a space 30 is left therebetween to accommodate other devices.

The common rail 3 spans the collection portions 28 of the two intake manifolds 26A and 26B. The intake manifolds 26A and 26B have bosses 31 projecting inward in a width direction of the engine. Each intake manifold 26A/26B has two bosses in the illustrated embodiment as shown in FIG. 2. The common rail 3 has four corresponding mounting portions 32. The mounting portions 32 are located on the mating bosses 31 and secured thereon by bolts 43 such that the common rail 3 is fixed onto the intake manifolds 26A and 26B. The position (height) of the common rail 3, after fixing, in the height direction of the engine is close to the upper surface of the collection portions 28. The common rail 3 has a generally flat shape. Accordingly, the space 30 is created below the common rail 3.

The common rail 3 has six fuel outlets 33, three on each lateral side. The common rail pressure sensor 13 is attached to the front end of the common rail 3, and a pressure limiter 34 is located at right front of the common rail 3. As illustrated in FIG. 1, the fuel exits 33 and pressure limiter 34 extend from a main body of the common rail 3 outward and upward in the width directions of the engine.

The supply pump 4, common rail 3, pressure limiter 34, injectors 1, fuel tank 5 and cylinder block have the fuel piping as illustrated in FIG. 5. Specifically, an outlet of the feed pipe 8 is connected to an inlet 35 of the supply pump 4. The supply pump inlet 35 opens in an upper face of the supply pump 4 near the front end. The supply pump 4 has an outlet 36 (FIG. 3) in its back face. An inlet of the high pressure pipe 9 is connected to the supply pump outlet 36. The outlet of the high pressure pipe 9 is connected to an inlet 37 of the common rail 3 formed in the right rear side wall of the common rail. The fuel outlets 33 of the common rail 3 are communicated with the injectors 1 by the high pressure pipes 2. The leakage fuel in the injectors 1 is discharged from the engine through fuel paths in the cylinder block. To this end, the leakage fuel pipe 12 extends from fuel outlets 39A and 39B of the banks 25A and 25B to the fuel tank 5. The leak fuel pipe 12 is also communicated with the pressure limiter 34. The fuel return pipe 14 that extends from a return outlet of the supply pump 4 merges with the leakage fuel pipe 12.

As mentioned earlier, the common rail 3 spans the two intake manifolds 26A and 26B. Therefore, the common rail 3 "floats" above the interbank valley of the V-type engine. Thus, even if the length of the supply pump 4 and/or common rail 3 becomes longer, it is possible to arrange the supply pump 4 and common rail 3 in an overlap manner. Accordingly, it is feasible to locate the supply pump 4 and common rail 3 within the total length L of the engine. In the illustrated embodiment, the common rail pressure sensor 13 is positioned above the supply pump 4 in the overlapping manner as best shown in FIG. 2.

Since the common rail 3 is located at an upper position, i.e., its position is shifted upwards, the space 30 is created below the common rail 3 between the banks 25A and 25B for accommodation of other devices. As a result, if additional devices and members such as turbocharger, EGR cooler, etc. should be provided, they can be placed in this space 30. In other words, the space 30 can be used effectively, and the engine total length is not elongated even in such a case.

Figure 4:
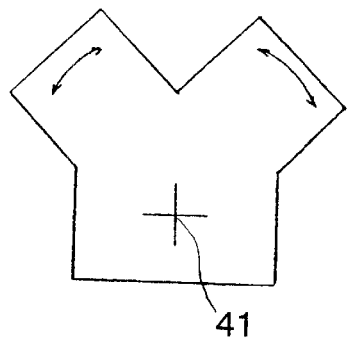
FIG. 4 schematically illustrates how two banks of the engine vibrate.

In the meantime, the V-type engine is generally subjected to lateral vibration, with the crankshaft 41 being a center of vibration, as indicated by the double arrows in FIG. 4, so that the banks 25A and 25B tend to "close" and "open" in the width direction of the engine. According to the illustrated embodiment, however, the common rail 3 bridges the intake manifolds 26A and 26B of the banks 25A and 25B so that it serves as a reinforcing member against the bank vibration. Thus, the banks 25A and 25B less or hardly vibrate in the width direction of the engine. As a result, vibrations of the intake manifolds 26A and 26B associated with those of the banks 25A and 25B are also suppressed.

In this embodiment, tile collection portions 28 of the intake manifolds 26A and 26B are further from the banks 21A and 21B and crankshaft than the distribution portions 29, and their positions are higher than the distribution portions 29. The common rail 3 is supported on such collection portions 28 of the intake manifolds 26A and 26B so that the common rail 3 extends as high as possible and leaves the space 30 as large as possible. The common rail 3 is also far from the center 41 of bank vibration so that it can demonstrate a large vibration damping effect. It should be noted that if the common rail 3 did not bridge the upper collection portions 28 but the lower distribution portions 29, the resulting space 30 would become smaller and the vibration damping effect would decrease. Further, the collection portions 28 would vibrate considerably since nothing supported them.

Moreover, the distance between the collection portions 28 is smaller than that of between the distribution portions 29 so that the common rail 3 does not become large if it extends between the collection portions 28, as illustrated in the drawing, than if it extends between the distribution portions 29.

Since the mounting portions 32 of the common rail 3 are placed on the corresponding bosses 31 of the intake manifolds 26A and 26B, securing of the common rail 3 is performed by simply putting the common rail 3 on the bosses 31 and tightening the four bolts 43 from the above.

It should be noted that a plurality of brackets may extend from the cylinder head or other structure to support the common rail 3 at a high position. However, relatively long brackets are separately required so that it may not be advantageous in terms of the number of parts and weight. In the illustrated embodiment, the intake manifolds 26A and 26B are taken advantage of for this purpose. Thus, the number of parts and weight do not increase.

The illustrated and described arrangement is disclosed in Japanese Patent Application No. 11-345258 filed on Dec. 3, 1999, the instant application claims priority of this Japanese Patent Application, and the entire disclosure thereof is incorporated herein by reference.

What is claimed is:

1. A diesel engine comprising:

two angularly disposed cylinder banks extending from a common crankcase and defining an intermediate valley;

intake manifolds mounted on inner walls of the two banks of the engine respectively; and a common rail bridging the intake manifolds;

wherein the common rail is supported by main bodies of the intake manifolds.

2. The diesel engine according to claim 1, wherein space is created below the common rail.

3. The diesel engine according to claim 1, wherein the common rail is supported by upper portions of the intake manifolds.

4. The diesel engine according to claim 1, wherein the common rail bridges the intake manifolds in a shortest path.

5. The diesel engine according to claim 1 further including at least one device below the common rail.

6. A diesel engine comprising:

two angularly disposed cylinder banks extending from a common crankcase and defining an intermediate valley;

intake manifolds mounted on inner walls of the two banks of the engine respectively;

a common rail bridging the intake manifolds; and a supply pump at a bottom of the interbank valley of the two banks.

7. The diesel engine according to claim 6, wherein the common rail and a supply pump extend in a longitudinal direction of the engine in an overlapping manner.

8. An engine arrangement comprising:

two angularly disposed cylinder banks extending from a common crankcase and defining an intermediate valley;

two intake manifolds mounted on inner walls of the two cylinder banks respectively;

a common rail extending between the intake manifolds; and a supply pump at a bottom of the interbank valley of the two banks.

9. The engine arrangement according to claim 8 further including space below the common rail.

10. The engine arrangement according to claim 9, wherein the common rail and a supply pump extend in a longitudinal direction of the engine in an overlapping manner.

11. The engine arrangement according to claim 10, wherein the common rail is supported by upper positions of the intake manifolds.

12. The engine arrangement according to claim 10, wherein the common rail is supported by main bodies of the intake manifolds.

13. The engine arrangement according to claim 11, wherein the common rail extends between the intake manifolds in a shortest path.

14. The engine arrangement according to claim 12, wherein the common rail extends between the intake manifolds in a shortest path.

15. The engine arrangement according to claim 13 further including at least one device below the common rail.

16. The engine arrangement according to claim 14 further including at least one device below the common rail.

17. An engine arrangement comprising:

two angularly disposed cylinder banks extending from a common crankcase and defining an intermediate valley;

two intake manifolds mounted on inner walls of the two cylinder banks respectively; and a common rail extending between the intake manifolds;

wherein the common rail is supported by main bodies of the intake manifolds.

* * * * *